Oct. 6, 1959  C. E. DOOLIN  2,907,268
SHAPING AND COOKING MACHINES
Filed May 8, 1958  2 Sheets-Sheet 1

INVENTOR.
CHARLES ELMER DOOLIN
BY
Alexander & Dowell
ATTORNEYS

Oct. 6, 1959 C. E. DOOLIN 2,907,268
SHAPING AND COOKING MACHINES
Filed May 8, 1958 2 Sheets-Sheet 2
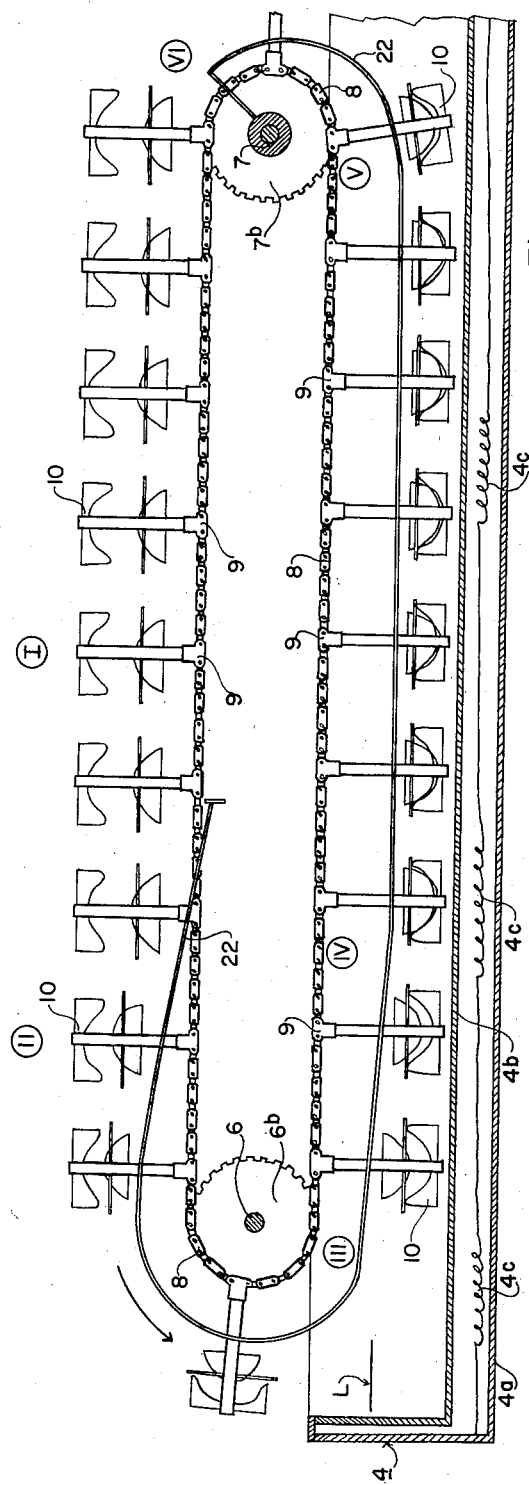
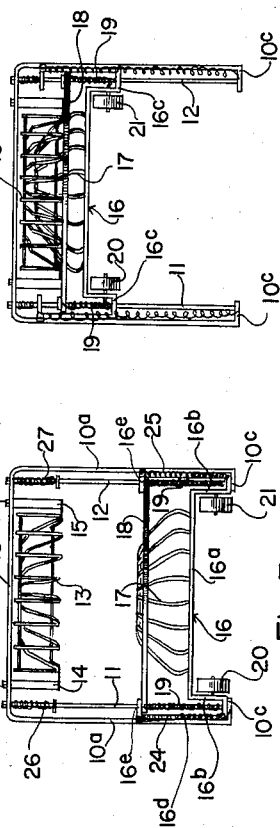
Fig. 2
Fig. 3
Fig. 4
INVENTOR.
CHARLES ELMER DOOLIN
BY
Alexander & Dowell
ATTORNEYS

United States Patent Office 2,907,268
Patented Oct. 6, 1959

2,907,268

SHAPING AND COOKING MACHINES

Charles E. Doolin, Dallas, Tex., assignor to The Frito Company, Dallas, Tex., a corporation of Texas Application May 8, 1958, Serial No. 733,898

17 Claims. (Cl. 99—353)

My invention relates to machines for shaping and cooking shells to form edible receptacles, and more particularly relates to machines of the conveyor type having continuous series of shaping baskets which travel in endless mutually spaced succession, each basket passing a loading position where a sheet of dough is inserted as the basket passes, and each basket then closing to shape the edible receptacle while passing the sheet of dough through a vat of heated cooking oil, and finally emerging from the oil and automatically discharging the cooked shell while returning to the loading position where the basket receives another sheet of dough and repeats the above cycle.

It is an object of the invention to provide an automatic machine which will shape and cook the shell in upright position so that no water vapor or other gas can be trapped in the receptacle during cooking, which entrapped vapor prevents full contact of the cooking oil with the dough sheet. As a result of experience gained in connection with a machine which cooked the shells in inverted position, it was found that after cooking the shell to a crisp condition, it frequently cracked across the bottom within a few days. Laboratory experiments indicated that the cracking was caused by the fact that the tapered sides of the finished shell retained a smaller percentage of moisture than the bottom of the shell. This was found to be due to the fact that during cooking, steam was trapped in the bottom of the inverted shell, said steam being created as the moisture content of the dough itself was cooked out. The entrapment of this steam in the inverted cup forced the oil out of the inside of the cup so that the oil did not maintain constant contact with all parts thereof during the cooking process. By pushing the oil away from the bottom of the cup, the steam could escape, but by the time it escaped and the oil returned to the cup, the cooking step was already well along, with the result that the cooking was not uniformly carried out on all parts of the shell. The present machine provides for cooking of the shells in right-side-up position, so that no steam can be trapped therein. It is, of course, possible to cook the shell in tilted position, at which time the bottom of the shell would be substantially vertical, but cooking in this position requires considerably more oil to cover the shell than does the upright position finally selected.

It is a further object of the invention to provide a machine which will discharge the cooked shell onto a conveyor in inverted position to permit complete drainage of the cooking oil therefrom.

Another important object of the invention is to provide a machine wherein the shaping baskets are initially brought part-way together to a position in which the sheet of dough is merely held in place with only slight distortion. Then, the sheet is immersed in the hot cooking oil and during this immersion the baskets are further closed to the final position wherein the shaping function has been fully carried out.

It is important to note that the final shaping is not applied by the baskets until the sheet of dough has been softened and made pliable by immersion thereof in the hot oil. This constitutes a novel sequence which permits the dough sheets to be partially precooked before they are placed in the shaping baskets. By such partial precooking, the dough sheets are brought to such a surface condition that they may be conveniently handled before and during insertion into the baskets. Ordinarily, if the sheets were partially precooked and permitted to cool before final shaping and cooking, the shaping of the precooked sheets would result in frequent breakage thereof. However, because of the sequential steps performed by the present machine whereby the shaping is carried out after softening by immersion in the hot cooking oil, such breakage is avoided because the immersion in the hot oil softens the sheets and makes them sufficiently pliable that they can respond satisfactorily to shaping by the baskets.

A still further object is to provide a novel and efficient structure for the shaping baskets and for their associated supporting and actuating mechanisms, and further to provide quick-disconnect securing means for maintaining the basket assemblies supported in spaced relation along the conveyor so that these assemblies may be quickly and conveniently removed for washing.

Another object of the invention is to provide a novel discharge mechanism for transferring the cooked shells from the shaping baskets onto a drainage conveyor.

Other objects and advantages of my invention will become apparent during the discussion of the drawings, wherein:

Fig. 2 is an enlarged schematic view taken in section lengthwise of the machine and showing the upper portion thereof including the cooking vat, one side of a conveyor including a series of basket assemblies, and one of the cam tracks controlling the actuation of the baskets to hold and shape the dough sheets.

Fig. 3 is an enlarged end view of a basket assembly showing the baskets separated.

Fig. 4 is a view similar to Fig. 3 but showing the baskets in fully closed position.

Fig. 5 is an enlarged perspective view of one of the basket assemblies showing the latter in open position.

Figure 1:
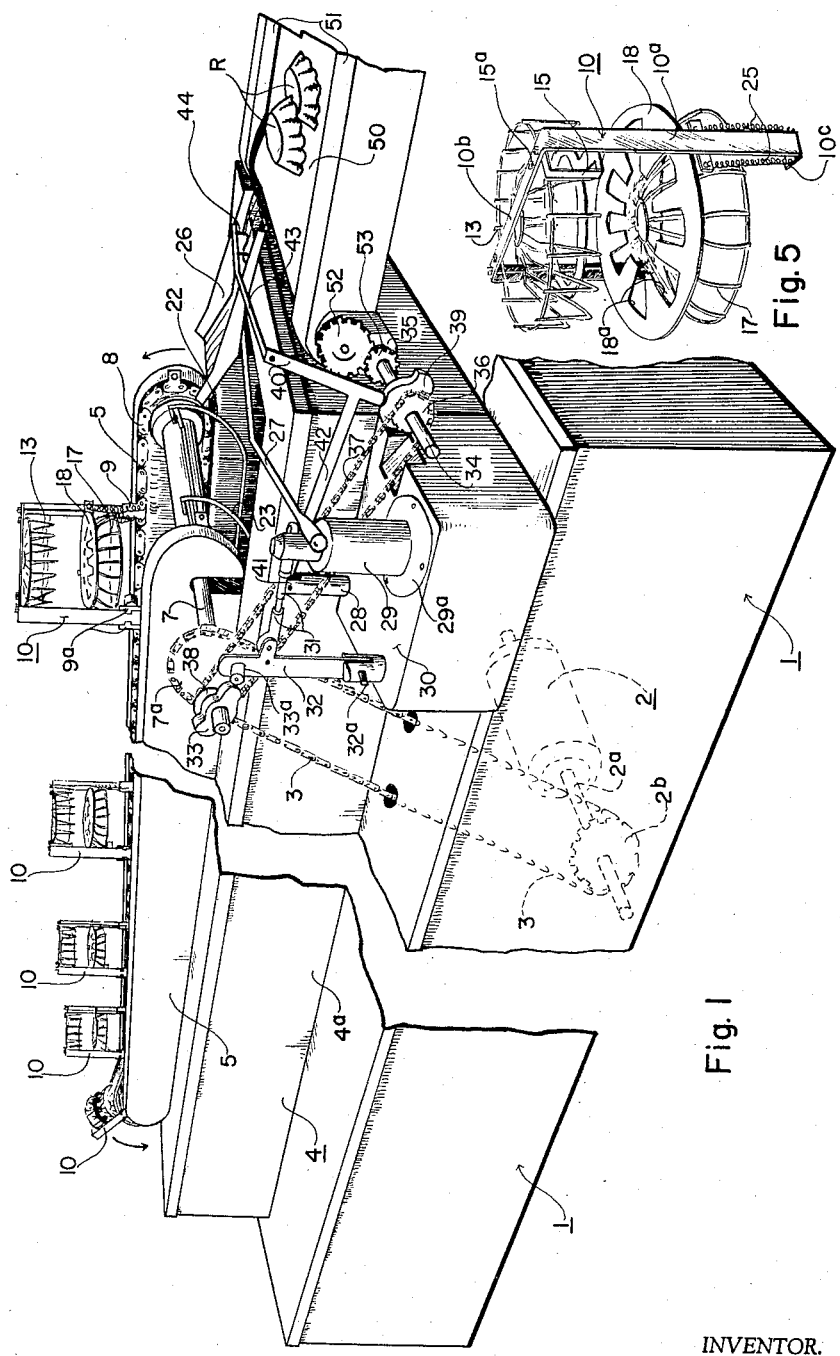
Figure 1 is a perspective view of my novel shaping and cooking machine operatively associated with a drainage conveyor.

Referring now to the drawings, Fig. 1 shows a supporting base 1 comprising an enclosed platform containing a drive motor 2 having a shaft 2a supporting a sprocket 2b around which the main drive chain 3 of the machine is passed. It is to be understood that any suitable type of motor may be used, and that shown in the present drawing is merely intended to be of a schematic nature. On the top of the base 1 is a cooking oil vat 4, which is schematically shown in cross-section in Fig. 2. This vat structure includes an outer housing 4a, an inner tank 4b, electrical heating means including coils 4c and control means for the coils including a thermostat of any suitable type (not shown).

Above the vat 4 and substantially coextensive therewith is located a conveyor means housed within a pair of side plates 5. The conveyor means comprises a pair of spaced shafts 6 and 7, the latter shaft being driven by the chain drive 3 which passes over a sprocket 7a fixed on the shaft 7. The shafts 6 and 7 also carry pairs of spaced sprockets 6b and 7b, of which one each is visible in Fig. 2. These pairs of sprockets carry two spaced endless chains 8, of which one is visible in Figs. 1 and 2. It should therefore be apparent that when the motor 2 is in operation, drive is furnished through the sprockets 2b and 7a via the chain 3, and this drive rotates the shaft 7. The chains 8 are thus caused to progress in the same direction around the respective pairs of spaced sprockets 6b and 7b carried by the shafts 6 and 7.

These chains 8 move in unison, and each carries a series of basket-assembly mounting brackets 9 which are respectively spaced along both of the chains at points exactly opposite each other. Each bracket 9 comprises an upright piece of sheet metal having opposite fingers 9a, Fig. 1, bent toward each other for the purpose of supporting the U-frames 10 which comprise a part of the basket assembly.

As can best be seen in Figs. 3, 4 and 5, each bracket assembly comprises a U frame 10 having two vertical portions 10a and a horizontal portion 10b. At the lower end of each of the vertical portions 10a is a foot 10c, and a pair of guide rods 11 and 12 are passed through a foot 10c and through the horizontal portion 10d of the U frame in mutually parallel relation. The guide rods are captivated in the U frames by any suitable means, and serve the purpose hereinafter explained. The horizontal portion 10b of each of the U frames, in addition, supports an upper shaper structure which comprises an open wire basket 13 supported on spaced yokes 14 and 15. These yokes are in turn secured to the horizontal portion 10b of the U frame by any suitable means such as screws 14a and 15a. The shape of the upper basket is best shown in Fig. 5.

Near the lower end of the assembly is located a sliding bracket 16 having a cross member 16a passing between two perpendicular members 16b which in turn are joined to outwardly extending members 16c. Each of these outwardly extending members 16c joins with an upwardly extending member 16d terminating in an inwardly extending member 16e which overlies the outwardly extending member 16c. The members 16e and and 16c each has a hole which is aligned with the hole in the other member and through which holes the guide rods 11 and 12 pass respectively. A lower shaper structure comprises an openwork wire basket 17 and is carried by the cross member 16a. Thus, when the support 16 carrying the basket 17 is moved up and down in the U bracket 10a, the lower basket 17 reciprocates with respect to the upper basket 13 within the limits shown in Figs. 3 and 4, the baskets being mutually interfitting.

A dough sheet receiving plate 18 also has holes through it on either side so that it can be captivated on the guide rods 11 and 12. The dough receiving plate 18 is provided with an aperture including an annular series of notches 18a, which can best be seen in Fig. 5, and these notches are so disposed that the lower basket 17 can pass upwardly partially through the notched-out aperture in the plate 18 so as to pass into mating relation with the upper basket 13, as shown in Fig. 4. Ordinarily, coil springs 19 surrounding the guide rods 11 and 12 press the sheet receiving plate 18 upwardly into contact with the lower surfaces of the inwardly extending members 16e.

The aperture through the plate 18 as defined by the notched-out portions 18a is so located that the downwardly extending members of the basket 13 cannot pass therethrough, and therefore when the bracket 16 is raised to the position shown in Fig. 4 the plate 18 abuts and is stopped by the lower members of the upper basket 13. When the bracket 16 is raised further, the springs 19 are then compressed, as shown in Fig. 4, and the upper portion of the lower basket 17 passes upwardly through plate 18 into mating relation with the upper basket 13. In this way the sheet of dough, which was previously placed on top of the plate 18 when the basket assembly was in open position as shown in Fig. 5, is shaped into a shell having fluted side walls and a flat bottom as can be seen at R to the extreme right in Fig. 1.

A cam track passes partway around each of the conveyor chains 8, and each of the cam tracks cooperates with one of the rollers 20 or 21 which are supported on shafts having one end fixed to the perpendicular members 16b. The cam tracks are marked 22 and 23, the track 23 being visible only in Fig. 1. These tracks are identical and control the opening and closing of the baskets. The rollers 20 and 21 in contact with the cam tracks 22 and 23 slide an associated basket 17 toward a basket 13, and in so doing oppose the action of tension springs 24 and 25 which continuously urge the lower basket 17 away from the upper basket 13. The tension springs are fixed at their upper ends to a point on the brackets 16 near the intersection of the upwardly extending members 16d and the inwardly extending members 16e. The lower ends of the springs 24 and 25 are captivated in holes through the feet 10c of the U bracket 10. In addition, springs 26 and 27 are provided near the upper ends of the guide rods 11 and 12 to provide an additional downward thrust on the inwardly extending members 16e when the lower basket is in raised position within the upper basket 13, as shown in Fig. 4.

As the conveyor chain is rotated, the baskets at the left end of the machine travel downwardly and the baskets at the right end of the machine travel upwardly. Along the upper run of the conveyor chains 8 the baskets are in open inverted position, the same position as shown in Figs. 3 and 5. As the baskets pass across the upper run of the conveyor, an attendant standing next to the machine places the dough sheets, one at a time, on the passing sheet receiving plates 18. This feeding of the dough sheets can be carried out at position I, as shown in Fig. 2. The baskets then pass to the left, and after they have traveled a short distance, the rollers 20 and 21 engage the rising cam tracks 22 and 23 in the vicinity of position II in Fig. 2. Each cam track rises to a certain lift distance as measured from the cam track to the adjacent run of the conveyor chain 8, and this lift distance then remains the same all the way round the left end of the machine to position III. The distance through which the cams move the rollers 20 and 21 and thereby move the lower baskets 17 toward the upper baskets 13 between positions II and III is just enough to bring the baskets part-way into engagement and clamp the dough sheet to prevent it from falling out of the basket as it turns toward its downward travel. From position III to position IV, the cam track is moving steadily further away from the lower run of the chain 8 to increase the lift distance with the result that the rollers 20 and 21 are moved further and further in the direction which moves lower basket 17 into the upper basket 13 by passing the former through the dough receiving plate 18. It is between position III and position IV, after immersion in the hot cooking oil filled at least as high as the level L (Fig. 2), that the flat dough sheet is formed into a shell in the shape of a cupped receptacle, as shown at R in Fig. 1. From position III through position IV to position V the shaped dough is cooked crisp, the time of such cooking being controlled by the rate at which the conveyor chains 8 travel with respect to the vat 4. While this cooking process is going on, the receptacles R are in right-side-up position. Then, at position V, the chain drive 8 begins raising the baskets out of the cooking oil. From position V to position VI, the cam tracks begin to approach the conveyor chain again, thereby permitting the tension springs 24 and 25 to begin separating the lower basket 17 from the upper basket 13. Finally, at position VI, the cam tracks terminate, and the baskets completely separate, dropping the shaped and cooked product onto a receiving plate 26, as shown in Fig. 1.

This receiving plate 26 is supported on an arm 27 which is fixed to a vertical shaft 28 journaled in a sleeve 29 having a flange 29a at the bottom thereof secured to the top of a mounting platform 30. The shaft 28 can rotate in the sleeve 29 so as to cause the receiving plate 26 to move back and forth toward and away from the conveyor chains 8. The shaft 28 is connected with an adjustable linkage 31 which is connected to a vertically disposed arm 32 pivoted as at 32a at its lower end. The upper end of the arm 32 carries a cam follower 33a which rides on the outer periphery of a two-lobe cam 33 rigidly connected to the end of shaft 7. It should therefore be apparent that as the shaft 7 rotates, the lobes of the cam 33 cause the arm 32 and linkage 31 to reciprocate back and forth and thereby rotate the shaft 28 to pivot the arm 27 and cause the receiving plate 26 to reciprocate back and forth. This unloading mechanism also includes another shaft 34 rotatably mounted in a bearing 35 and carrying a sprocket 36. A chain 37 passes around this sprocket and also around a sprocket 38 fixed to the shaft 7 so that when the shaft 7 rotates, the shaft 34 is also rotated. The shaft 34 also carries a two-lobe cam 39, and the lobes of this cam cause the linkage 40 to be moved up and down about a fixed pivot 41. When the linkage 40 moves up and down, it also raises and lowers an associated horizontal arm 43 having at its outer end a pusher 44. When the receiving plate 26 moves toward the conveyor 8, the position of the cam 33 is so timed that a basket assembly will be just rising from position V to position VI, at which latter position the cam track terminates allowing the two baskets 17 and 13 to separate and drop the cooked cup R onto the receiving plate 26. The receiving plate at that point pivots to the right all the way but the arm 43 is raised so as to elevate the pusher out of the way and permit the receiving plate and cup R to move rightwardly therebelow. At this time, the cam 39 permits the pusher to drop back into its lower position and the receiving plate 26 is then retracted to the left. The pusher contacts the cooked cup R on the receiving plate and prevents it from returning leftwardly with the receiving plate 26. As a result, the receiving plate slides out from under the cooked shell R which is thus deposited on the upper run of a conveyor 50. This conveyor 50 passes through spaced frame members 51, and is advanced by rotation of the gear 52 which meshes with another gear 53 carried on the rotating shaft 34. The details of the conveyor 50 form no part of the present invention and therefore will not be further described.

The conveyor chains 8 continue to run in a counter-clockwise direction as shown in Fig. 2, thereby returning the open baskets from position VI to the loading position at I. It is desirable that the baskets be easily removed for washing, and therefore the lower ends of the U-shaped supporting members 10a merely frictionally fit into the brackets 9 between the fingers 9a, as shown in Fig. 1. Whenever it is desired to wash a basket assembly, it can be removed from the brackets 9 merely by pulling it outwardly. The entire mechanism is intended to operate continuously, and the only manual step involved is the loading of the baskets as they pass position I by placing a sheet of partially precooked dough on the dough-supporting plates 18 traveling therepast.

I do not limit my invention to the exact form shown in the drawings, for obviously changes may be made therein within the scope of the claims.

I claim:

1. A machine for shaping and cooking shells from sheets of dough, comprising an open cooking vat containing heated cooking oil; endless conveyor means passing said vat; support frames attached at spaced intervals along said conveyor means; a pair of dough shaping baskets mounted in each frame, at least one of said baskets being reciprocable with respect to the other and said baskets being immersed in said cooking oil during part of their travel with the conveyor; cam track means extending in a path adjacent the conveyor means; and cam follower means carried in each support frame for engaging said cam track means, said follower means mating said baskets while they are immersed.

2. In a machine as set forth in claim 1, spaced brackets along said conveyor means, and said support frames connecting with said brackets by quick-detachable retaining means.

3. In a machine as set forth in claim 1, said cam follower means each comprising roller means connected with a reciprocable basket, the other basket being fixed in the frame, said cam track means running adjacent said conveyor means but at varying distances therefrom, and said roller means reciprocating the associated basket in accordance with said distances.

4. In a machine as set forth in claim 1, said cam track means being so located with respect to the conveyor means that the baskets are fully separated after emerging from the vat, partially closed when approaching the vat, and are gradually moved to fully mated position after immersion in the oil and before being withdrawn therefrom.

5. In a machine as set forth in claim 4, a discharge mechanism adjacent the end of the vat from which the baskets emerge and comprising a receiving plate reciprocably mounted adjacent the vat, synchronized drive means between the conveyor means and the receiving plate and timing the reciprocation of the plate so that it is moved under each pair of baskets as they separate, said plate catching the cooked shell; and means for removing the shells from the plate at the other end of its reciprocatory motion.

6. In a machine as set forth in claim 5, said latter means comprising a pusher located near the position of the plate farthest from the conveyor means and timed in synchronism therewith to be moved toward and away from the path of the plate whereby the pusher will move away from the path to permit the plate carrying a shell to pass, but will move into the path of the plate to abut the shell while the plate moves back toward the conveyor leaving the shell behind.

7. In a machine as set forth in claim 1, spring means urging each pair of baskets apart, and said cam follower means when in contact with the cam opposing the action of said spring means.

8. In a machine as set forth in claim 1, said baskets comprising wire loops respectively intermeshing when said baskets are mated, and a dough receiving plate located therebetween and having apertures therethrough so located that the wire loops of one basket may pass therethrough to mate with the other basket, and a spring suspension between the plate and said one basket and carrying the latter in unison toward said other basket until the plate is in contact therewith.

9. A machine for shaping and cooking shells from sheets of dough, comprising an open cooking vat in the form of an elongated tank containing heated cooking oil; endless conveyor means having a forward run passing over the open vat and having a return run passing above the forward run; support frames attached at spaced intervals along said conveyor means; a pair of dough-shaping baskets mounted in each frame in mutually reciprocable relation and the baskets being immersed in the cooking oil during the forward run of the conveyor means; and basket actuating means adjacent the conveyor means for mating said baskets while they are immersed and opening the baskets as they emerge.

10. In a machine as set forth in claim 9, said baskets holding the shells upright in the cooking oil, but inverting the shells as they emerge from the oil, and a discharge mechanism adjacent the end of the vat where the shells emerge and catching the shells in inverted position as the baskets open.

11. In a machine as set forth in claim 10, said mechanism comprising a receiving plate reciprocably mounted adjacent the vat, synchronized drive means between the conveyor means and the receiving plate and timing the plate to be moved under each pair of baskets as they open, and means for removing the shells from the plate at the other end of its reciprocatory motion.

12. In a machine as set forth in claim 11, said latter means comprising a pusher located near the position of the plate farthest from the conveyor means and timed in synchronism therewith to be moved toward and away from the path of the plate whereby the pusher will move away from the path to permit the plate carrying a shell to pass, but will move into the path of the plate to abut the shell while the plate moves back toward the conveyor leaving the shell behind.

13. In a machine as set forth in claim 9, spaced brackets along said conveyor means, and said support frames connecting with said brackets by quick-detachable retaining means.

14. In a machine as set forth in claim 9, said actuating means comprising cam track means running adjacent said conveyor means; and follower means carried by each frame and reciprocating at least one basket with respect to the other according to the distance of the cam track means from the conveyor means, the baskets being separated when they begin to travel the return run, partially closed when approaching the end of the return run, and said baskets gradually moving to fully mated position during the forward run after immersion in the oil.

15. A machine for shaping and cooking shells from sheets of dough, comprising a cooking vat containing heated oil; conveyor means passing said vat; support frames attached at spaced intervals along said conveyor means and being immersed in the oil as they move therepast; a pair of interfitting dough shapers carried by each frame and having follower means controlling the nesting and separating of said shapers; and cam means disposed along the path of the conveyor means and contacting said follower means, the cam means partially mating each pair of shapers before the frame enters the oil and then gradually moving the shapers to fully mated position after immersion therein.

16. In a machine as set forth in claim 15, said shapers emerging from one end of the vat, and said cam means terminating near said end whereat the shapers separate to release the cooked shell.

17. In a machine as set forth in claim 15, said shapers while immersed maintaining the dough shell in upright position.

References Cited in the file of this patent

UNITED STATES PATENTS

| | | |
|---|---|---|
| 2,352,447 | Powers | June 27, 1944 |
| 2,603,143 | Saenz | July 15, 1952 |
| 2,731,905 | Morgan | Jan. 25, 1956 |